United States Patent
Kamimura

(10) Patent No.: US 6,996,325 B1
(45) Date of Patent: Feb. 7, 2006

(54) SYSTEM FOR CREATING CONTENTS INFORMATION AND FOR AVOIDING DOWNLOAD ERRORS OF THE CONTENTS INFORMATION

(75) Inventor: Megumi Kamimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/511,443

(22) Filed: Feb. 23, 2000

(30) Foreign Application Priority Data

Mar. 31, 1999 (JP) .............................. P11-093753

(51) Int. Cl.
H04N 5/76 (2006.01)
H04N 7/18 (2006.01)

(52) U.S. Cl. ......................................... 386/46; 725/76
(58) Field of Classification Search ................ 386/6–8, 386/69, 68, 70, 82, 95, 46; 360/69, 72.1, 360/72.2, 72.3; 369/32.1, 47.1, 52.1, 53.1; 725/75–77; H04N 5/76, 5/783, 5/781, 9/79

See application file for complete search history.

(56) References Cited

U.S. PATENT DOCUMENTS

| | | | |
|---|---|---|---|
| 5,546,365 A | | 8/1996 | Roth |
| 5,581,529 A | | 12/1996 | Roth et al. |
| 5,675,734 A | | 10/1997 | Hair |
| 6,014,381 A | * | 1/2000 | Troxel et al. .......... 370/395.52 |
| 6,215,745 B1 | * | 4/2001 | Sako et al. .............. 369/47.12 |
| 6,587,637 B2 | * | 7/2003 | Nagasaka et al. ............. 386/69 |
| 6,598,227 B1 | * | 7/2003 | Berry et al. ................... 725/77 |
| 6,711,631 B1 | * | 3/2004 | Chan et al. ................... 710/14 |
| 2003/0123855 A1 | * | 7/2003 | Okada et al. ................. 386/98 |

FOREIGN PATENT DOCUMENTS

| | | |
|---|---|---|
| DE | 299 10 175 | 10/1999 |
| EP | 0 308 148 | 3/1989 |
| EP | 11259971 | 9/1999 |
| FR | 2 714 760 | 7/1995 |
| WO | WO 98/48532 | 10/1998 |

OTHER PUBLICATIONS

International Search Report.

* cited by examiner

Primary Examiner—Thai Tran
(74) Attorney, Agent, or Firm—Reed Smith LLP

(57) ABSTRACT

A method of and apparatus for creating contents in which contents information of source may be created within an authoring processing thereby to avoid a mistake from occurring when contents information is downloaded onto a server. An apparatus for creating contents information includes an A/D converting device (35) for input sources such as audio or video source, a data compression device (34) supplied with an A/D-converted or digitally-converted input source, a data adding device (37) supplied with a data-compressed or compressed input source and an information creation device (36) of contents information for input source. Since a table of contents information concerning input sources may be simultaneously saved for the authoring processing in which an input source is compressed, it is possible to remove a contents information creation work required when contents information may be downloaded onto an AV server which is restricted from a time and place standpoint.

11 Claims, 8 Drawing Sheets

FIG. 2

| SERIAL NO. | PC CARD ADDRESS | AUDIO CHANNEL | AUDIO | CONTENTS INDEX | CONTENTS TIME | AVAILABLE CLASS | AVAILABLE ROUTE (FROM TOKYO) | PRIORITY |
|---|---|---|---|---|---|---|---|---|
| 1 | 0010h | 1 | MONO | CLASSIC MUSIC | 60 MINUTES | ALL | CHICAGO (B747) | 1 |
| 2 | 01F0h | 2 | STEREO | SONGS IN JAPAN | 10 MINUTES | BUS, FIRST | LONDON (MD-11) | 5 |
| 3 | 03F0h | 3 | STEREO | CHANNEL FOR CHILDREN | 60 MINUTES | ALL | PARIS (DC10) | 4 |
| 4 | 0550h | 4 | MONO | POPULAR MUSIC | 30 MINUTES | FIRST | MILANO (B747) | 2 |
| 5 | 0A00h | 5 | STEREO | RAKUGO STORY, ENTERTAINMENT | 60 MINUTES | ALL | HONOLULU (B747) | 3 |
| ------- | ------- | ------- | ------- | ------- | ------- | ------- | ------- | ------- |

FIG. 3

| SERIAL NO. | DVD RAM ADDRESS | VIDEO CHANNEL | AUDIO | CONTENTS INDEX | CONTENTS TIME | AVAILABLE CLASS | AVAILABLE ROUTE (FROM TOKYO) | PRIORITY |
|---|---|---|---|---|---|---|---|---|
| 1 | 0100h | 1 | BILINGUAL | TITANIC | 3H | ALL | CHICAGO (B747) | 1 |
| 2 | 1F00h | 2 | STEREO | PAULINE | 1.5H | BUS, FIRST | LONDON (MD-11) | 4 |
| 3 | 2D55h | 3 | STEREO | DEEP IMPACT | 1.5H | ALL | PARIS (DC10) | 2 |
| 4 | 4E00h | 4 | BILINGUAL | THE MASK OF ZORRO | 1.5H | FIRST | MILANO (B747) | 5 |
| 5 | 7FD0h | 5 | STEREO | WORLD HERITAGE | 1.5H | ALL | HONOLULU (B747) | 3 |
| ------ | ------ | ------ | ------ | ------ | ------ | ------ | ------ | ------ |

FIG. 5

| SERIAL NO. | HDD ADDRESS | AUDIO CHANNEL | AUDIO | CONTENTS INDEX | CONTENTS TIME | AVAILABLE CLASS | AVAILABLE ROUTE (FROM TOKYO) | PRIORITY |
|---|---|---|---|---|---|---|---|---|
| 1 | 0010h | 1 | MONO | CLASSIC MUSIC | 60 MINUTES | ALL | CHICAGO (B747) | 1 |
| 2 | 01F0h | 2 | STEREO | SONGS IN JAPAN | 10 MINUTES | BUS, FIRST | LONDON (MD-11) | 5 |
| 3 | 03F0h | 3 | STEREO | CHANNEL FOR CHILDREN | 60 MINUTES | ALL | PARIS (DC10) | 4 |
| 4 | 0550h | 4 | MONO | POPULAR MUSIC | 30 MINUTES | FIRST | MILANO (B747) | 2 |
| 5 | 0A00h | 5 | STEREO | RAKUGO STORY, ENTERTAINMENT | 60 MINUTES | ALL | HONOLULU (B747) | 3 |
| ------ | ------ | ------ | ------ | ------ | ------ | ------ | ------ | ------ |

FIG. 6

| SERIAL NO. | HDD ADDRESS | VIDEO CHANNEL | AUDIO | CONTENTS INDEX | CONTENTS TIME | AVAILABLE CLASS | AVAILABLE ROUTE (FROM TOKYO) | PRIORITY |
|---|---|---|---|---|---|---|---|---|
| 1 | 0100h | 1 | BILINGUAL | TITANIC | 3H | ALL | CHICAGO (B747) | 1 |
| 2 | 1F00h | 2 | STEREO | PAULINE | 1.5H | BUS, FIRST | LONDON (MD-11) | 4 |
| 3 | 2D55h | 3 | STEREO | DEEP IMPACT | 1.5H | ALL | PARIS (DC10) | 2 |
| 4 | 4E00h | 4 | BILINGUAL | THE MASK OF ZORRO | 1.5H | FIRST | MILANO (B747) | 5 |
| 5 | 7FD0h | 5 | STEREO | WORLD HERITAGE | 1.5H | ALL | HONOLULU (B747) | 3 |
| ------ | ------ | ------ | ------ | ------ | ------ | ------ | ------ | ------ |

F I G. 7
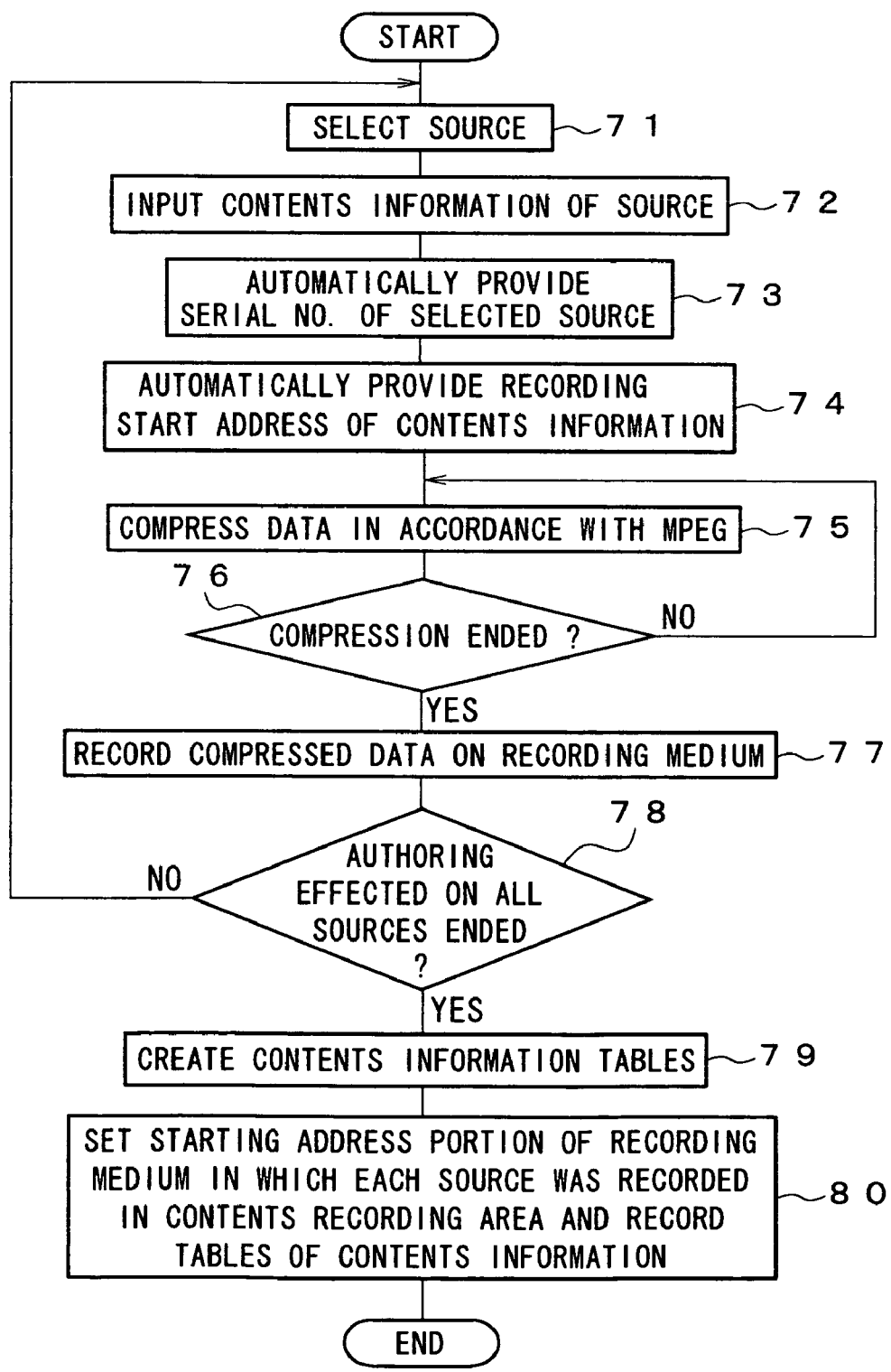

SYSTEM FOR CREATING CONTENTS INFORMATION AND FOR AVOIDING DOWNLOAD ERRORS OF THE CONTENTS INFORMATION

BACKGROUND OF THE INVENTION

1. Field of the Invention

The present invention generally relates to a method of and apparatus for creating contents. More particularly, this invention relates to a method of and apparatus for creating contents in which upon authoring processing for creating audio or video source information as digital data that can be recorded on a recording medium, contents information concerning all compressed source information may be generated at the same time the audio or video information may be compressed and the contents information thus generated may be recorded together with the compressed data thus processed by the authoring processing, whereby a time required for making contents when the compressed source information may be stored in a different recording medium may be eliminated to thereby reduce a storage processing time and a rate of errors which will be caused when contents are created can be improved.

2. Description of the Related Art

A data processing in which source data such as audio data, video data or superimposition data may be encoded in accordance with respective data compression systems and may finally become data of the type that can be recorded on a recording medium such as a disk (digital data) might be called an authoring processing.

In the authoring processing, audio data as well as video data may be compressed in accordance with an MPEG2 (Moving Pictures Experts Group 2) standard. Compressed data may be recorded on a recording medium at every source data such as audio data source or compressed data may be recorded and saved under the condition that these compressed data may be multiplexed.

When the compressed data (source data) obtained after the authoring processing is downloaded to other recording medium, for example, when the compressed data is downloaded from the above-mentioned recording medium to an in-flight service AV (audio/visual) server installed within the cabin (e.g. data storage apparatus of mass-storage using a hard disk drive HDD), in order to facilitate the future retrieval, contents information such as titles or genres of source data recorded on the recording medium (compressed data obtained after the authoring processing) may be added to the compressed data and then downloaded onto this AV server.

The above-mentioned AV server apparatus for use within the cabin should not record new source information thereon or existing source information of the AV server should not be replaced with new source information under the condition that it may be disassembled from the cabin. The reason for this is that once installed, in-flight equipment should not be carried to the outside of the cabin from a safety administration standpoint according to the prescription.

Consequently, when the above-mentioned source information is downloaded onto the AV server apparatus installed within the cabin, such download processing should be executed within the cabin, and contents information of source should be inputted within the cabin.

However, when a number of source information may be recorded or when there may be many items of contents information to be inputted, it takes a lot of time for inputting such many items of contents information to be inputted.

Also, when contents information may be inputted by an operator from the airplane manufacturer, such operator may not be an expert operator. As a result, the operator tends to make a mistake when inputting contents information. There is then the risk that specific source information will not be retrieved in the future. It is needless to say that this problem is not caused by the reason that the storage means such as the AV server apparatus should not be moved according to the prescriptions.

SUMMARY OF THE INVENTION

It is an object of the present invention to provide a method of and apparatus for creating contents in which contents information of sources may be inputted and saved in a recording medium at the same time source data may be compressed and the downloading of the contents of the recording medium may be finished only by the download processing so that a time for inputting at least contents information can be eliminated and a mistake which will occur upon inputting contents information can be avoided.

According to an aspect of the present invention, there is provided a method of creating contents comprising the steps of inputting first contents information concerning an audio input source or a video input source or an audio and video source, compressing a signal of the input source according to the need, recording a compressed signal of the input source on a recording medium, designating recording position information useful for recording the compressed signal of the input source on the recording medium, creating a table containing at least more than one second contents information concerning a predetermined input source in which the recording position information is added to the first contents information concerning the input source and recording the table on the recording medium.

According to other aspect of present invention, there is provided an apparatus for recording contents which is comprised of a circuit for inputting first contents information concerning an audio input source or a video input source or an audio and video input source, a compressing circuit for compressing a signal of the input source according to the need, a control circuit for conferring recording position information useful for recording the compressed signal of the input source on a recording medium, a creation circuit for creating a table containing at least more than one second contents information concerning a predetermined input source in which the recording position information is added to the first contents information concerning the predetermined input source, a data adding circuit for supplying the compressed signal of the compressing circuit and the table of the creation circuit to the recording medium and a recording medium having the compressed signal of the input source and the table recorded thereon.

According to a further aspect of the present invention, there is provided a recording medium on which an audio input source or a video input source or an audio and video source is recorded. A contents recording medium has recorded thereon a signal of the input source compressed according to the need and a table containing at least more than one second contents information in which recording position information for recording on the recording medium is added to first contents information concerning the input source.

In accordance with a further aspect of the present invention, there is provided a method of downloading compressed data and a first table from a first recording medium on which compressed data of an audio input source or a video input source of an audio and video input source and the first table indicating first contents information containing reproducing position information concerning the input source are recorded on a second recording medium. This method of downloading contents comprises the steps of downloading the first table from the first table, reading out compressed data of a predetermined input source from the first recording medium based on the reproducing position information of the first contents information concerning a predetermined input source on the first table and downloading the compressed data thus read to the second recording medium, memorizing recording position information useful for recording the compressed data on the second recording medium, creating a second table containing at least more than one second contents information in which reproducing position information in the first contents information concerning the predetermined input information is replaced with recording position information useful for recording on the second recording medium and recording the second table on a second recording medium.

In accordance with yet a further aspect of the present invention, there is provided a contents storage and distribution apparatus having downloaded thereto compressed data and a first table from a first recording medium in which compressed data of an audio input source or a video input source or an audio and video input source and the first table indicating first contents information containing reproducing position information concerning said input source are recorded together. This contents storage and distribution apparatus comprises a reproduction circuit for downloading the first table from the recording medium, a second recording medium having recorded thereon compressed data of a predetermined input source read out from the first recording medium based on reproducing position information of the first contents information concerning a predetermined input source on the first table and a control circuit for conferring recording position information useful for recording the compressed data on the second recording medium and creating a second table containing at least more than one second contents information concerning a predetermined input source in which reproducing position information in the first contents information concerning the predetermined input source is replaced with recording position information for recording on the second recording medium.

According to the present invention, a variety source information such as audio and video source information may be compressed in accordance with a predetermined compression format. Concurrently with this compression processing, a contents table of recorded source information may be created by inputting contents information of recorded source. The contents table thus created may be recorded on a starting portion of a recording medium to be saved.

When the source information thus compressed may be downloaded onto a different storage apparatus such as an AV server apparatus, the contents table also may be downloaded simultaneously. By reading the contents table thus downloaded, the order in which source information should be distributed may be confirmed, and source information to be distributed to the passengers in the cabin may be confirmed.

BRIEF DESCRIPTION OF THE DRAWINGS

FIG. 2 is a diagram showing a table of audio contents information;

FIG. 3 is a diagram showing a table of video contents information;

FIG. 5 is a diagram showing a table of retrieval audio contents information;

FIG. 6 is a diagram showing a table of retrieval video contents information;

FIG. 7 is a flowchart to which reference will be made in explaining the manner in which contents information is recorded.

DESCRIPTION OF THE PREFERRED EMBODIMENT

A method of and apparatus for creating contents according to an embodiment of the present invention will hereinafter be described with reference to the drawings, in which case video and audio data are downloaded to a server apparatus installed within the cabin.

Figure 1:
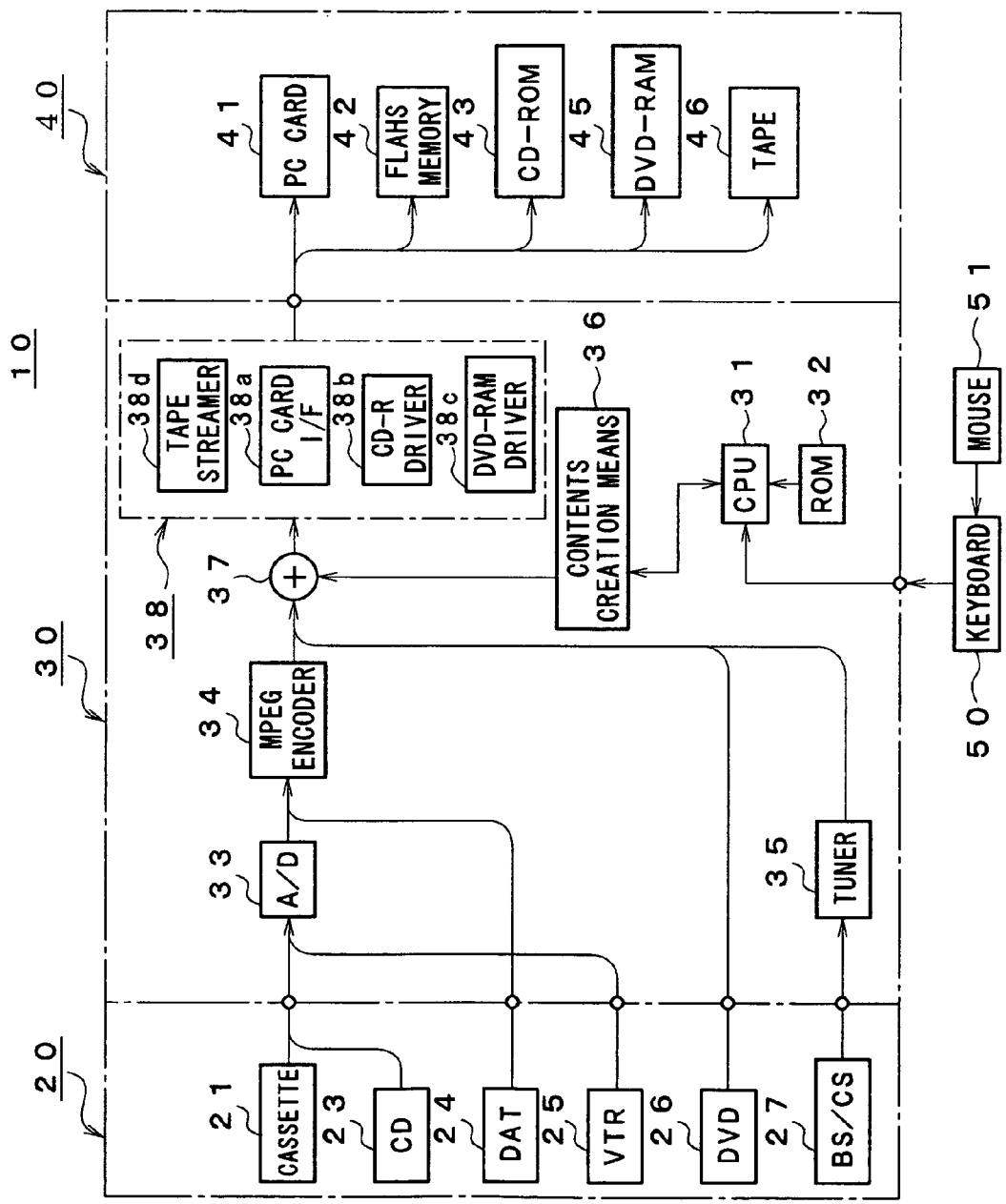
FIG. 1 is a block diagram showing a main portion of an authoring apparatus to which a contents creating apparatus according to an embodiment of the present invention is applied.

FIG. 1 of the accompanying drawings is a block diagram showing a main portion of an authoring apparatus 10 which may function as a contents creation apparatus according to an embodiment of the present invention.

As shown in FIG. 1, the authoring apparatus 10 may comprise a source 20 for selecting a source to be recorded and an authoring processing section 30 in which the selected source may be compressed in a predetermined compression fashion and contents information for the compressed source may be inputted. The compressed source containing contents information may be recorded and retained in a archive recording medium 40 suitable for such compressed source.

Arrangements of respective sections will be described below in detail.

Roughly classified, the source 20 might be an audio source and a video source. The audio source will be described first. There may be an analog audio source and a digital audio source. As the analog audio source, there may generally be considered a reproduced audio signal from a cassette tape 21 and a reproduced audio signal from a compact disc (CD) 23. As the digital audio source, there may be considered a digital audio signal from a digital audio tape recorder (DAT) 24.

As shown in FIG. 1, the analog audio signal may be supplied to the authoring processing section 30. The authoring processing section 30 may include a control section 31 which might be formed of a CPU (central processing unit). A memory means 32 such as a ROM (read-only memory) connected to this control section 31 has stored therein a control program for authoring processing, or the like.

The analog audio signal supplied to the authoring processing section 30 may be supplied to an A/D (analog-to-digital) converting section 33, in which it is converted into a digital audio signal, and then supplied to a data compression section 34. The data compression section 34 may compress data in accordance with the MPEG2 (Moving Pictures Experts Group 2) standard. Hence, an MPEG encoder may be used as the data compression section 34.

The digital audio signal from the DAT 24 may not be supplied to the A/D converting section 33 but may be directly supplied to the MPEG encoder 34, in which it is converted into compressed data of MPEG format.

On the other hand, typical video sources may be an analog video signal from a video tape recorder (VTR) 25 and a digital video signal from a digital video disk (DVD) 26. Both of the analog video signal and the digital audio signal may contain a digital audio signal. The digital video signal may be a signal conforming to the MPEG standard. The analog video signal from the VTR 25 may be supplied to the above-mentioned A/D converting section 33, in which it may be converted into a digital signal. Then, this digital signal may be supplied to and compressed into data of MPEG2 format by the data compression section 34.

Audio and video signals from a satellite broadcasting and a broadcasting satellite (BS) 27 using a communication satellite may be digital signals (MPEG signals). A digital video signal (digital audio signal) from a specific broadcasting station may be selected by a tuner 35.

The compressed data from the data compression section 34 and the MPEG compressed data outputted from the tuner 35 may be supplied through a data adding means 37 to a driver 38 which may drive the recording medium 40. Contents information from a contents information creation means 36 may also be supplied to the data adding means 37, and may be supplied to the above-mentioned driver 38 after all compressed data had been recorded on the recording medium 40. In this embodiment, the area of the starting portion of the recording medium may be reserved as a contents information recording area, and a table of contents information may be recorded on this contents information recording area under control of the control section 31.

Contents information may be inputted by using a keyboard 50 or an external input means 51 such as a mouse. Inputted data may be supplied through the control section 31 to a contents information creation means 36 and thereby a table of contents information may be created. A program for creating a table of contents information may be stored in the ROM 32.

FIGS. 2 and 3 show examples (tables) of source contents information. FIG. 2 shows a table of contents information concerning an audio signal. In FIG. 2, an item "audio channel" may represent the recording order number (channel number). An item "audio" may represent information which may determine whether audio data is monaural audio data or stereo audio data. An item "contents index" may represent genres of audio sources. FIG. 2 illustrates five genres (classic music, popular music, etc.). An item "contents time" may represent a time period of audio sources (net time).

When the contents creation apparatus may be an AV (audio/visual) apparatus on the airplane, available services become different depending on passenger classes so that different distribution services are available for first class, business class and economy class. Therefore, audio and video sources may be classified, and the available class may represent such passenger class. "All" in the available class may represent that audio and video sources of the same contents should be distributed to all passenger classes.

An item "available route" may represent the airway airplanes. In the illustrated example, there may be displayed manufacturers of available airplanes as well as a departure, i.e. Tokyo (Narita) and destinations. In this connection, "B747" may represent Boeing 747. An item "priority" may represent a priority concerning an access order (distribution order) which may be set with reference to data indicating the history and situation in which audio and video sources had been used.

When an operator may input data ranging from the channel No. to the priority, as shown in FIGS. 2 and 3, the starting addresses in which respective sources should be recorded may automatically be given to the contents information creation means 36. At the same time, the serial Nos. indicating the order in which the sources should be inputted also may be automatically given to the contents information creation means 36. The contents information table (data) may be recorded on the recording area secured on the starting address side of the recording medium.

Audio source compressed data containing the contents information table data may be supplied to the driver 38 which may drive the recording medium 40 as shown in FIG. 1. The arrangement of the driver may be changed depending upon the type of the recording medium used therefor. When the recording medium 40 may be a card-like recording medium such as a PC card (personal computer card) 41 or a flash memory 42, a PC card interface (I/F) 38a may be used as the driver 38. Similarly, when the recording medium 40 may be a CD-ROM 43, a CD-R (CD-rewritable) driver 38b may be used as the driver 38. When the recording medium 40 may be the DVD-RAM 45, a DVD-RAM driver 38c may be used as the driver 38. Then, when the tape 46 may be used as the recording medium 40, a tape streamer 38d may be used as the driver 38.

Figure 4:
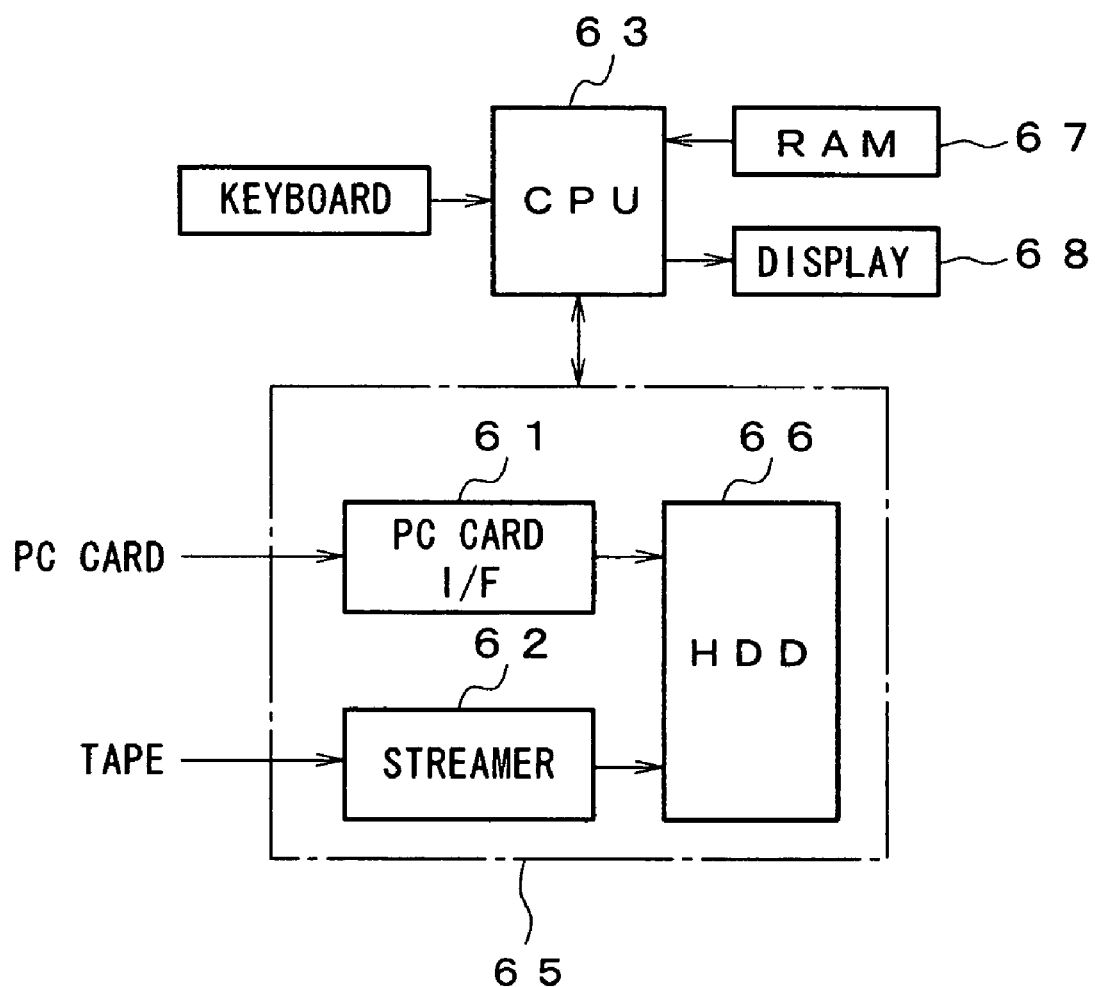
FIG. 4 is a block diagram showing a main portion of a download apparatus according to an embodiment of the present invention.

FIG. 4 is a block diagram showing a main portion of a download apparatus 60 used when compressed data is downloaded to a server apparatus 65 installed within the cabin of the airplane by using the recording medium 40 in which compressed data of audio and video data were recorded according to an embodiment of the present invention.

In order to download all of compressed data from a plurality of recording mediums 40 which may be different in type, this download apparatus 60 may include a PC card interface 61 and a tape streamer 62 which may contain the flash memory 42 in this embodiment. Therefore, when compressed data may be retained in the CD-ROM 43 or the DVD-RAM 45, such compressed data may be downloaded via a PC card by using a portable driver (not shown) on which the CD-ROM 43 or the DVD-RAM 45 may be loaded. The above-mentioned portable driver might be of either the type incorporated within the server apparatus 65, which will be described later on, or the type of the external portable driver.

When the recording medium 40 may be loaded on the driver 61 or the tape streamer 62 serving as the corresponding data read means, the compressed data may be read out from the recording medium 40 under control of the control section 63 formed of a personal computer, and the compressed data thus read may be written in the corresponding area of the AV server apparatus 65 which may function as a data storage apparatus of a mass storage using a HDD (hard disk drive), or the like. This compressed data may be written in accordance with a download processing program provided within the control section 63. A retrieval contents information table also may further be created in accordance with this program.

Data of the retrieval contents information table created upon downloading may be stored in a memory means 67 such as a RAM. Also, the contents of such data can be displayed on a display section 68 such as an LCD (liquid-crystal display).

FIGS. 5 and 6 show examples of such retrieval contents information tables. The tables shown in FIGS. 5 and 6 may substantially be the same as those shown in FIGS. 2 and 3, and may differ from those shown in FIGS. 2 and 3 only in that the items on the second column are changed into HDD starting address in the server apparatus 65. The HDD starting address may be the starting address of the HDD 66 in which the retrieval contents information table may be recorded when compressed data of audio source or video source may be downloaded onto the HDD 66. The operator may be able to retrieve audio source or video source contents information by selecting the serial No. or by designating the HDD starting address.

When compressed data of audio source or video source may be downloaded onto the server apparatus 65, the operator may operate only a download start key (not shown) provided on the control section 63, and other keys need not be controlled. Therefore, the operator need not input contents information after having confirmed the audio or video source when compressed data of audio source or video source may be downloaded onto the server apparatus 65. In addition, since the operator may operate only a download key, even when an operator in the airplane manufacturer may execute the downloading, an error can be prevented from occurring in the download processing.

FIG. 7 is a flowchart to which reference will be made in explaining the manner in which the above-mentioned contents information may be generated together with an audio source and a video source.

Referring initially to FIG. 7, and following the start of operation, a source (audio source or video source) may be selected at a step 71. Then, control goes to a step 72, wherein contents information of the selected source may be inputted. The contents information may be the contents of the items shown in FIG. 2 or 3 and may be inputted by the operator. Since the operator can input contents information while confirming data, there may be lowered a probability that a mistake will occur when the operator inputs contents information.

After the operator finished inputting all contents information for the selected source, the serial number of the selected source and the recording start address of contents information on the recording medium 40 may be automatically given respectively at steps 73 and 74. Thereafter, source data is compressed according to the MPEG standard at a step 75. Then, control goes to the next decision step 76, whereat it is determined whether or not the compression of the source data is ended. If the compression of the source data is ended as represented by a YES at the decision step 76, then control goes to a step 77. In the step 77, the compressed data is recorded on the recording medium 40. If the compression of the source data is not ended as represented by a NO at the decision step 76, then control goes back to the step 75, and the following step will be executed.

Control goes to the next decision step 78, whereat it is determined whether or not the input processing of such contents information, the automatic providing processing of the recording start address and the data compression processing are effected on all source information. If the above-mentioned authoring processing is ended as represented by a YES at the decision step 78, then control goes to a step 79. In the step 79, the tables of such contents information (see FIGS. 2 and 3) are created. Then, control goes to a step 80, whereat data indicative of the contents information tables thus created are recorded on the contents recording area (starting address portion of the recording medium 40) set in the recording medium 40. If the above-mentioned authoring processing is not ended as represented by a NO at the decision step 78, then control goes back to the step 71, and the following steps will be executed again. Then, a series of this processing may be ended.

Figure 8:
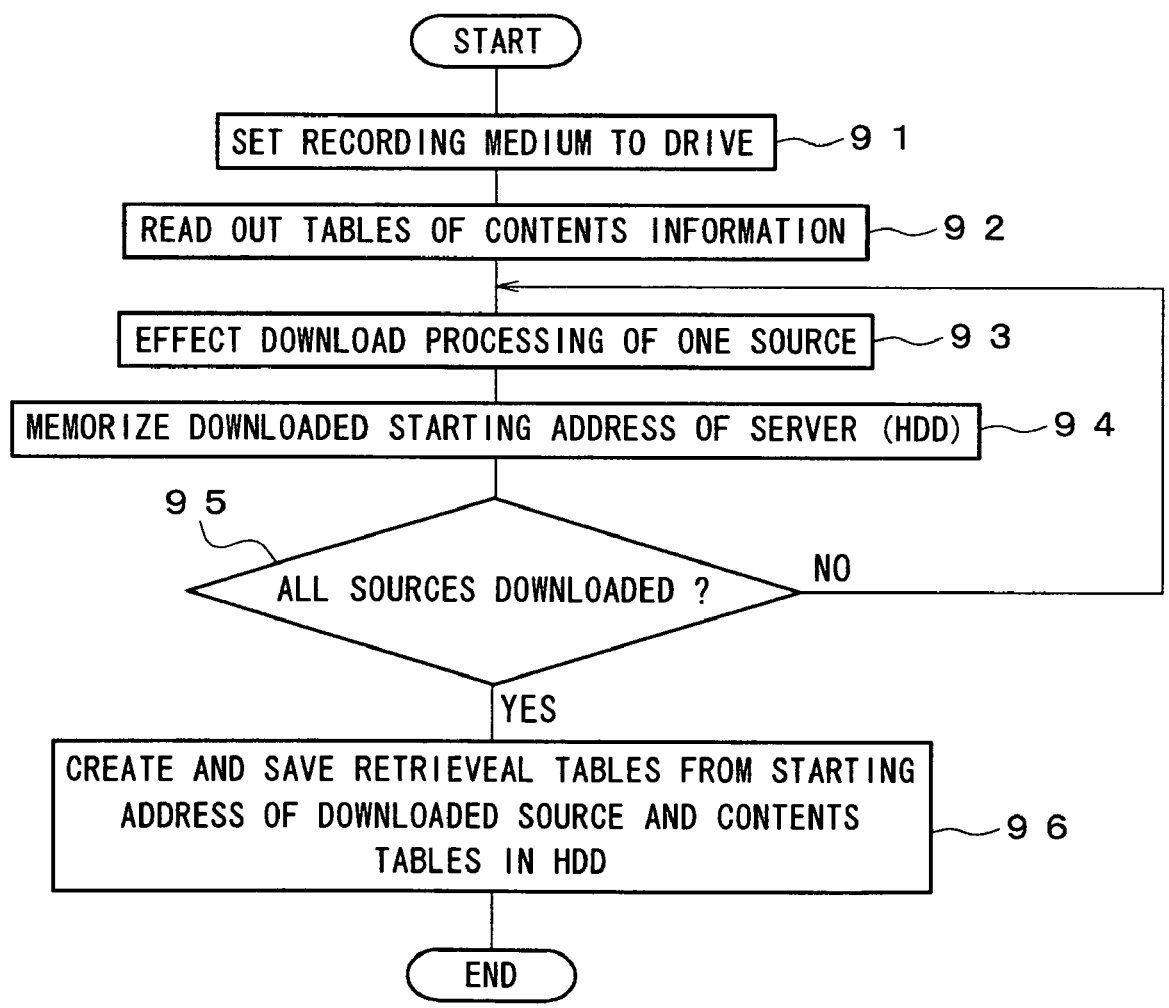
FIG. 8 is a flowchart to which reference will be made in explaining a download processing.

FIG. 8 is a flowchart to which reference will be made in explaining the manner in which contents information of source may be downloaded onto the AV server apparatus 65.

Referring to FIG. 8, and following the start of operation, at a step 91, the recording medium 40 that should be downloaded may be set to a drive (including a tape streamer) provided within the AV server apparatus 65. Control goes to a step 92, whereat data indicative of contents information tables are read out from an arbitrary source of the recording medium 40 and then saved.

Control goes to a step 93, whereat source data may be downloaded from the serial No. 1 after the data indicative of contents information table had been read out from the arbitrary source of the recording medium 40. Then, the starting address of the source data thus downloaded may be memorized in the HDD 66 at a step 94. Control goes to the next decision step 95, whereat it is determined whether or not the above-mentioned processing is effected on all sources of the recording medium 40. If data of all sources are downloaded as represented by a YES at the decision step 95, then control goes to a step 96. In the step 96, the tables of retrieval contents information (see FIGS. 5 and 6) are created from the starting address of the downloaded data and the contents information tables, and these tables are saved. After this data saving is ended, a series of download processing may be ended.

While the present invention is applied to the contents information creation processing and the download processing required when compressed data is downloaded onto the AV server apparatus installed within the cabin of airplane as described above, the compressed data storage means may not be limited to such AV server apparatus.

As set forth above, according to the present invention, when the authoring processing is executed, contents information of authoring source may be created. Further, according to the present invention, source information in which contents information were created by the authoring processing may be downloaded.

According to the present invention, since contents information can be created upon authoring processing, the operator can input contents information under circumstances free from time and place restrictions, and hence contents information without error can be saved in the recording medium.

Thus, since a work for inputting contents information on the airplane manufacturer side in which the airplane should be maintained and inspected can be removed, the input error having time and place restrictions can be substantially completely avoided.

Therefore, according to the present invention, there can be provided an authoring system which is extremely suitably applied to the audio and video distribution system for use with the airplane, or the like.

Having described a preferred embodiment of the invention with reference to the accompanying drawings, it is to be understood that the invention is not limited thereto and that various changes and modifications could be effected therein by one skilled in the art without departing from the spirit or scope of the invention as defined in the appended claims.

What is claimed is:

1. A method of creating content for passenger user selectable entertainment in an on-board in-flight system, comprising the steps of:

inputting a plurality of first content items each comprising a different audio information;

recording the first content items on a recording medium;

preparing a first table listing of information related to the first content items, the first table listing comprising, for each first content item, a serial number identifying the first content item on the recording medium, a channel number of the on-board in-flight system for the first content item, a text description of the first content item, and availability conditions of the first content item;

storing the first table listing in conjunction with the first content items on the recording medium; and wherein the on-board in-flight system allows a passenger to select one or more of the first content items having availability per the first table listing during the passenger's flight using the serial number of each selected first content item per the first table listing.

2. The method according to claim 1, wherein:

the step of recording comprises, designating recording position informations useful for recording each of the first content items on the recording medium, wherein the recording position informations are addresses of a personal computer card or a DVD RAM or a hard disk drive; and each address is stored in association with the serial number of a corresponding first content item in the first table listing.

3. The method according to claim 1, further comprising the steps of:

inputting a plurality of second content items each comprising a different video information;

recording the second content items on the recording medium;

preparing a second table listing of information related to the second content items, said second table listing comprising, for each second content item, each of, a physical address of the second content item on the recording medium, a channel number for the second content item in the on-board in-flight system, a text description of the second content item, and availability conditions of the second content item; and storing the second table listing in conjunction with the second content items on the recording medium;

wherein:

the first content items comprise only audio;

the second content items comprise only audio visual; and the in-flight on-board system allows a passenger to select, during the passenger's flight, and one or more of the second content items having availability per the second table listing using the physical address of each selected second content item per the second table listing.

4. The method according to claim 3, wherein the first content items and the second content items are recorded on the recordable medium in a same format.

5. The method according to claim 3, wherein the first content items and the second content items are recorded on the recordable medium in MPEG format.

6. The method according to claim 1, wherein the availability conditions comprise specific flights and specific routes of a commercial airliner in which the on-board in-flight audio visual system is installed.

7. The method according to claim 5, wherein the availability conditions are only specific flights and specific routes of a commercial airliner in which the on-board in-flight system is installed and which the recorded medium has been provided without removing or installing electronic equipment from the airliner.

8. The method according to claim 1, wherein the availability conditions comprise flight routes and flight classes.

9. The method according to claim 8, wherein the availability conditions further comprise a designation of airliner manufacturer and model number.

10. The method according to claim 9, wherein the audio visual system is permanently installed in a commercial airliner.

11. A method of creating content for passenger user selectable entertainment in an on-board in-flight audiovisual system, comprising the steps of:

inputting a plurality of first content items each comprising a different audio only information;

inputting a plurality of second content items each comprising a different audio visual information;

recording the first content items on a recording medium in an audio visual format;

recording the second content items on the recording medium in the audio visual format;

preparing a first table listing of information related to the first content items, the first table comprising, for each first content item, each of, a serial number identifying the first content item, a physical address of the first content item on the recording medium, a channel number of the first content item for the on-board in-flight audiovisual system, a text description of the first content item, and availability conditions of the first content item;

storing the first table listing in conjunction with the first content items on the recording medium;

preparing a second table listing of information related to the second content items, said second table comprising, for each second content item, each of, a serial number identifying the second content item, a physical address of the second content item on the recording medium, a channel number of the second content item for the on-board in-flight audiovisual system, a text description of the second content item, and availability conditions of the second content item;

storing the second table listing in conjunction with the second content items;

wherein:

the in-flight on-board audiovisual system allows a passenger to select, during the passenger user's flight, one or more of the first content items having availability per the first table listing using the serial number of each selected first content item per the first table listing, and one or more of the second content items having availability per the second table listing using the serial number of each selected second content item per the second table listing;

the audio visual format comprises an MPEG format; and the availability conditions comprise a specific combination of flight, route, and class of travel of a commercial airliner in which the on-board in-flight audio visual system is installed and which the recorded medium has been provided without removal or installation of electronic equipment from/to the airliner per applicable regulations.

\* \* \* \* \*